United States Patent [19]

Aoyama

[11] Patent Number: 4,752,726
[45] Date of Patent: Jun. 21, 1988

[54] REACTIVE POWER COMPENSATION DEVICE

[75] Inventor: Fumio Aoyama, Fuchu, Japan

[73] Assignee: Kabushiki Kaisha Toshiba, Kanagawa, Japan

[21] Appl. No.: 91,030

[22] Filed: Aug. 31, 1987

[30] Foreign Application Priority Data

Sep. 9, 1986 [JP] Japan ................................ 61-210558

[51] Int. Cl.⁴ ............................................. G05F 1/70
[52] U.S. Cl. ..................................... 323/207; 323/210
[58] Field of Search ............... 323/205, 207, 210, 211; 373/102, 104

[56] References Cited

U.S. PATENT DOCUMENTS

| 3,936,727 | 2/1976 | Kelley et al. | 323/210 |
| 4,028,614 | 6/1977 | Kelley | 323/210 |
| 4,602,199 | 7/1986 | Walker | 323/207 |

FOREIGN PATENT DOCUMENTS

| 1932272 | 12/1970 | Fed. Rep. of Germany | 323/207 |
| 2247819 | 4/1974 | Fed. Rep. of Germany | 323/207 |

OTHER PUBLICATIONS

The Transactions of the Institute of Electrical Engineers of Japan, vol. 103-B, No. 7, pp. 483–490, "Generalized Theory of the Instantaneous Reactive Power and its Applications", H. E. Akagi et al., Jul. 1983 (untranslated).

Primary Examiner—William H. Beha, Jr.
Attorney, Agent, or Firm—Foley & Lardner, Schwartz, Jeffery, Schwaab, Mack, Blumenthal & Evans

[57] ABSTRACT

A reactive power compensation device for a system including an AC power source and a load. The device comprises a first detection circuit for detecting reactive power in the load; a first reactive power compensation circuit, having a reactor, a thyristor and a capacitor, the thyristor being controlled based on the detected reactive power in the load; a second detection circuit for detecting total reactive power in the load and the first compensation circuit; a second reactive power compensation circuit having a self-commutated power converter connected in parallel to the load. The second compensation circuit is controlled to minimize the detected total reactive power in the load and the first compensation circuit.

4 Claims, 4 Drawing Sheets

REACTIVE POWER COMPENSATION DEVICE

BACKGROUND OF THE INVENTION

1. Field of the Invention

This invention relates to a reactive power compensation device for suppressing voltage variation in an AC power supply system caused by sharp variations of reactive power in the load.

2. Description of the Prior Art

When reactive power variations are irregular and large, as in an arc furnace, effective compensation of these variations necessitates rapid detection of the reactive power in the load and determination of the firing phase of thyristors of a reactive power compensation device in accordance with the detected reactive power so as to make the response of the reactive power compensation device to the variations as fast as possible.

A conventional reactive power compensation device is now discussed referring to FIG. 1. A load 10 of varying reactive power is connected to an AC power supply 12. The power supply 12 has a power source 14 and a system impedance 16 in series. A reactive power compensation circuit 18 is connected in parallel with the load 10. The compensation circuit 18 has a phase-lead capacitor 20 and a reactor 22 connected in parallel, and a pair of anti-parallel thyristors 24 connected in series with the reactor 22.

A voltage detector 26 is arranged to detect the voltage applied on the load 10, and a current transducer 28 is arranged to detect the current "i" flowing into the load 10.

The thyristors 24 are controlled by a controller 30 based on the output signals of the voltage detector 26 and the current transducer 28. Since lagging-phase reactive power $Q_L$ received by the reactor 22 from the power supply 12 can be varied by the thyristors 24 through arbitrary phase control of the firing angle α (alpha) in the range 0–100% as shown in FIG. 2, a reactive power compensation device is formed which compensates for the lagging-phase reactive power $Q_F$ of the load 10 through a combination with the leading-phase reactive power $Q_C$ in the capacitor 20.

For example, if the leading-phase reactive power of the phase-lead capacitor 20 is designated as $Q_C$ and the lagging-phase reactive power of the reactor 22 as $Q_L$, the total leading-phase reactive power $Q_T$ received from the power supply is $$Q_T = Q_C - Q_L \quad (1)$$

$Q_L$ is a function of the firing angle α of the antiparallel thyristors, as shown in FIG. 2. Therefore, it is obvious from Eq. (1) that $Q_T$ is also a function of α, as shown in FIG. 3, and that $Q_T$ can be controlled by controlling the firing angle α.

The overall reactive power $Q_S$ received from the power supply 12 is $$Q_S = Q_F + Q_T \quad (2)$$

If the reactive power of the load 10, $Q_F$, is detected and $Q_T$ is controlled to be equal to $-Q_F$, $Q_S$ becomes zero, and the lagging-phase reactive power $Q_F$ is supplied from the reactive power compensation device.

Referring to FIG. 1, the controller 30 has a reactive power detector 32, a function generator 34, a comparator 36 and a pulse amplifier 38.

The reactive power detector 32 evaluates the reactive power $Q_F$ in the load 10 by the voltage measured by the voltage detector 26 and the current i measured by the current transducer 28.

The function generator 34 is a circuit which generates $Q_T$ of Eq. (1) as a function of the firing angle α, as shown in FIG. 3.

The comparator 36 compares the two output signals of the reactive power detector 32 and of the function generator 34, and sends a pulse when the two output signals coincide. The pulse amplifier 38 amplifies the pulse to supply a gate signal to the thyristors 24.

The control is effected in a manner such that $Q_T$ compensates for the reactive power $Q_F$ of the load 10, as shown in FIG. 4. However, as seen in FIG. 4, with a thyristor phase-control reactor type reactive power compensation device in which reactive power consumed by a reactor is controlled by thyristors as described above, an opportunity for firing the thyristors occurs only twice in each power supply voltage cycle. Therefore, in principle, this control comprises half a cycle of dead time. In control of voltage flicker caused by reactive power variation of a load as typified by an arc furnace, this dead time is not negligible and so control effects are unsatisfactory.

SUMMARY OF THE INVENTION

An object of this invention is to provide a reactive power compensation device which provides good voltage fluctuation control, is reliable and yet is still economical to produce.

Another object is to provide a method of reactive power compensation which provides good voltage fluctuation control, is reliable and is economical.

According to one aspect of the invention, there is provided a device for compensating for reactive power in a system including an AC power source and a load, the device comprising: means for detecting reactive power in the load; a first reactive power compensation circuit, having a reactor and a thyristor connected in series, and a capacitor connected in parallel to the reactor and the thyristor, the first compensation circuit being connected in parallel to the load, the thyristor being controlled based on the detected reactive power in the load; means for detecting total reactive power in the load and the first compensation circuit; a second reactive power compensation circuit having a self-commutated power converter connected in parallel to the load; and means for controlling the second compensation circuit to minimize the detected total reactive power in the load and the first compensation circuit.

According to another aspect of the invention, there is provided a method of compensating for reactive power in a system including an AC power source and a load, the method comprising steps of: detecting reactive power in the load; compensating for reactive power in the load based on the detected reactive power in the load by a first compensation circuit which has a reactor and a thyristor connected in series, and a capacitor connected in parallel to the reactor and the thyristor; detecting total reactive power in the load and the first compensation circuit; and compensating reactive power in the load and the first compensation circuit based on the detected total reactive power in the load and the first compensation circuit by a second reactive power compensation circuit having a self-commutated power converter connected in parallel to the load.

Further objects, features and advantages of the present invention will become apparent from the detailed description of the preferred embodiment that follows, when considered with the attached drawings.

BRIEF DESCRIPTION OF THE DRAWINGS

The accompanying drawings, which are incorporated in and constitute a part of this specification, illustrate a preferred embodiment of the invention and, together with the description, serve to explain the principles of the invention. In the drawings.

DETAILED DESCRIPTION OF THE PREFERRED EMBODIMENT

Figure 5:
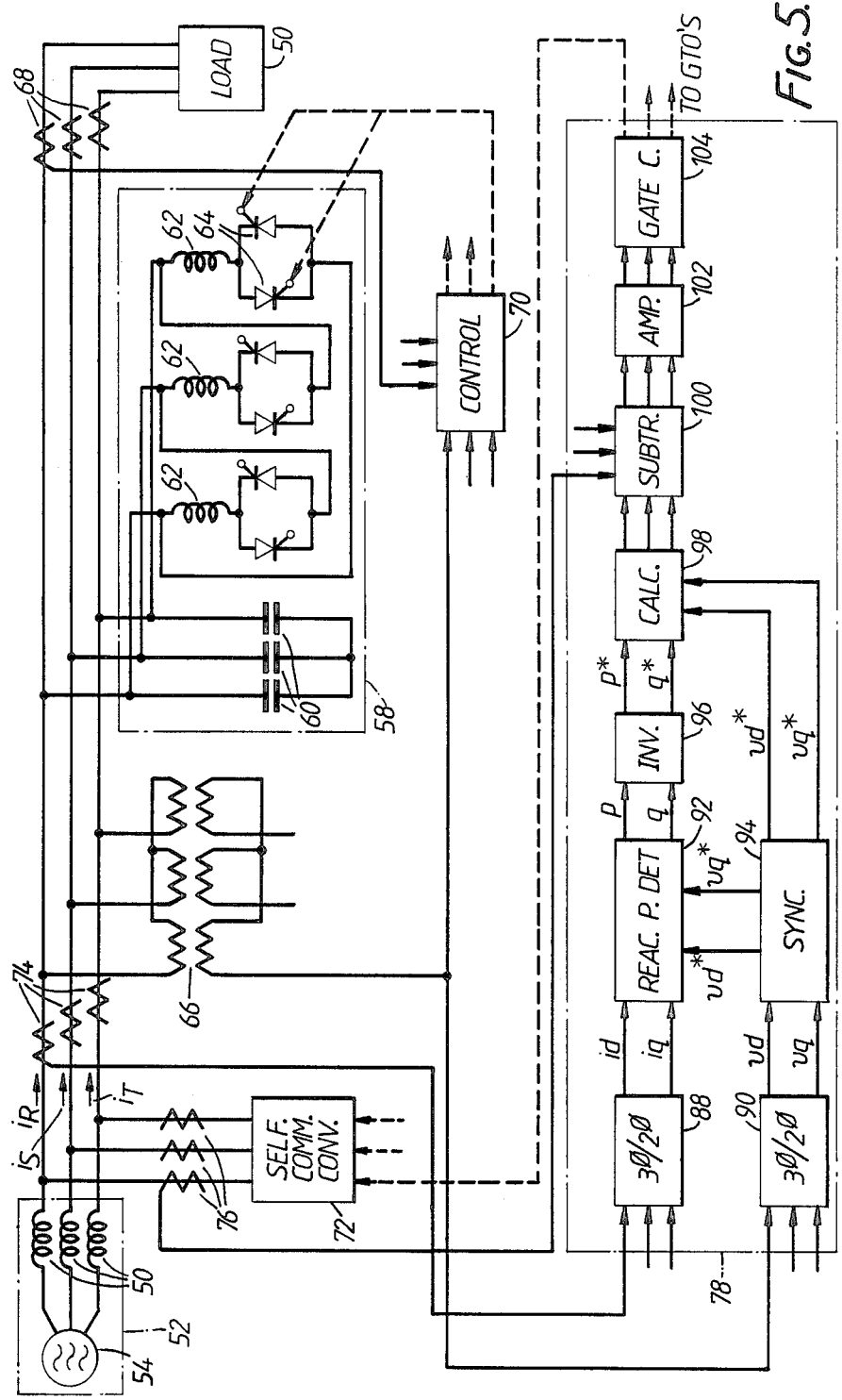
FIG. 5 is a schematic diagram of an embodiment of a reactive power compensation device of this invention.
Figure 6:
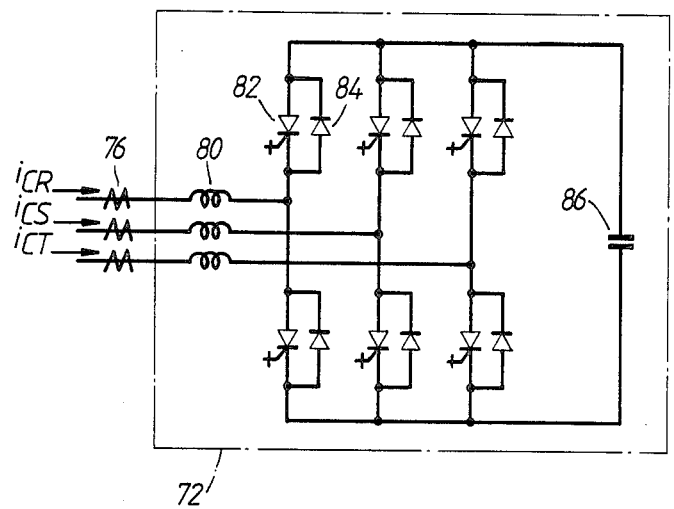
FIG. 6 is a detailed diagram of the self-commutated converter shown in FIG. 5.

One embodiment of this invention is described referring to FIGS. 5 and 6. In FIG. 5, some of the instrumentation lines and control lines are omitted for clarity.

Figure 1:
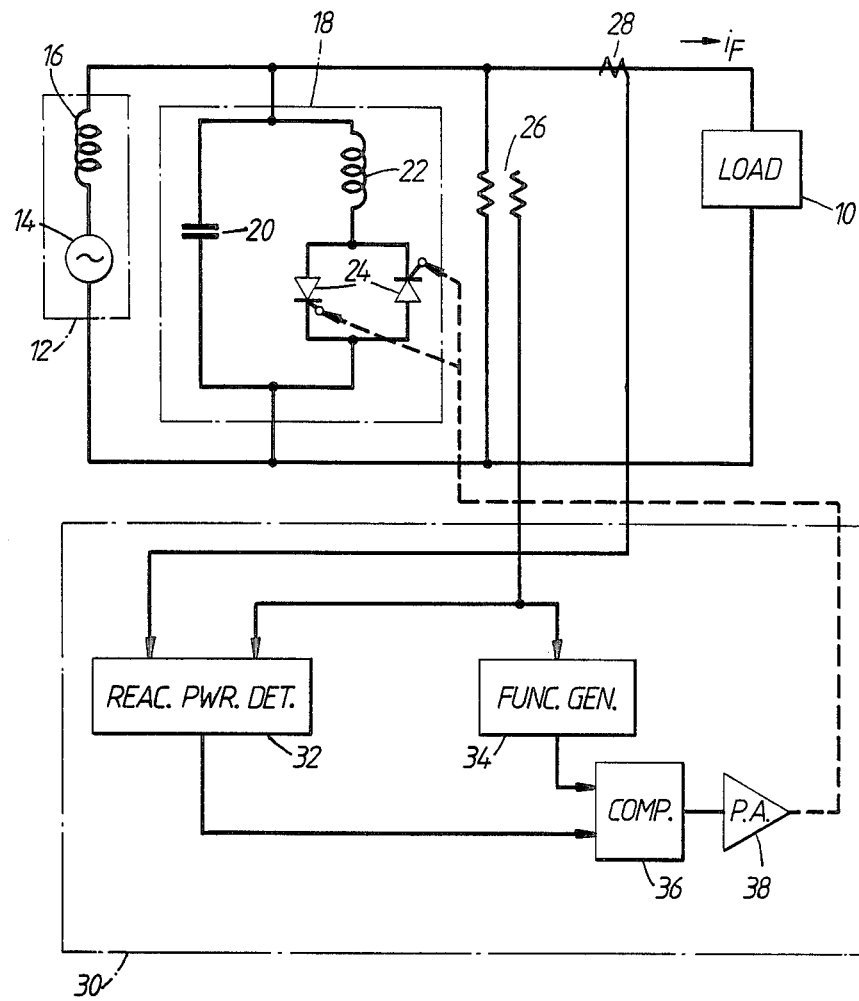
FIG. 1 is a schematic diagram of a reactive power compensation device of the prior art.
Figure 2:
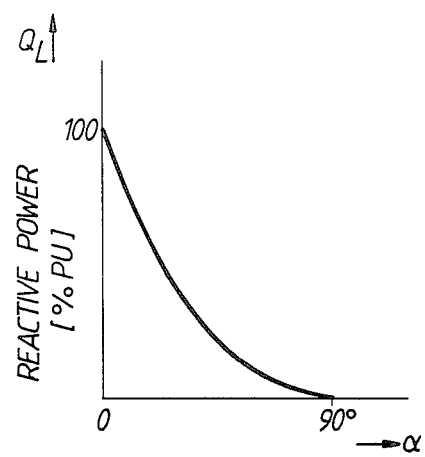
FIG. 2 is a graph plotting the relation between the reactive power flowing in the reactor and the firing angle of the thyristors in the device shown in FIG. 1.
Figure 3:
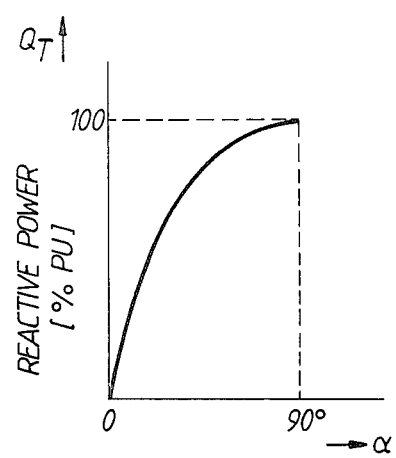
FIG. 3 is a graph plotting the relation between the total reactive power received from the power supply and the firing angle of the thyristors in the device shown in FIG. 1.
Figure 4:
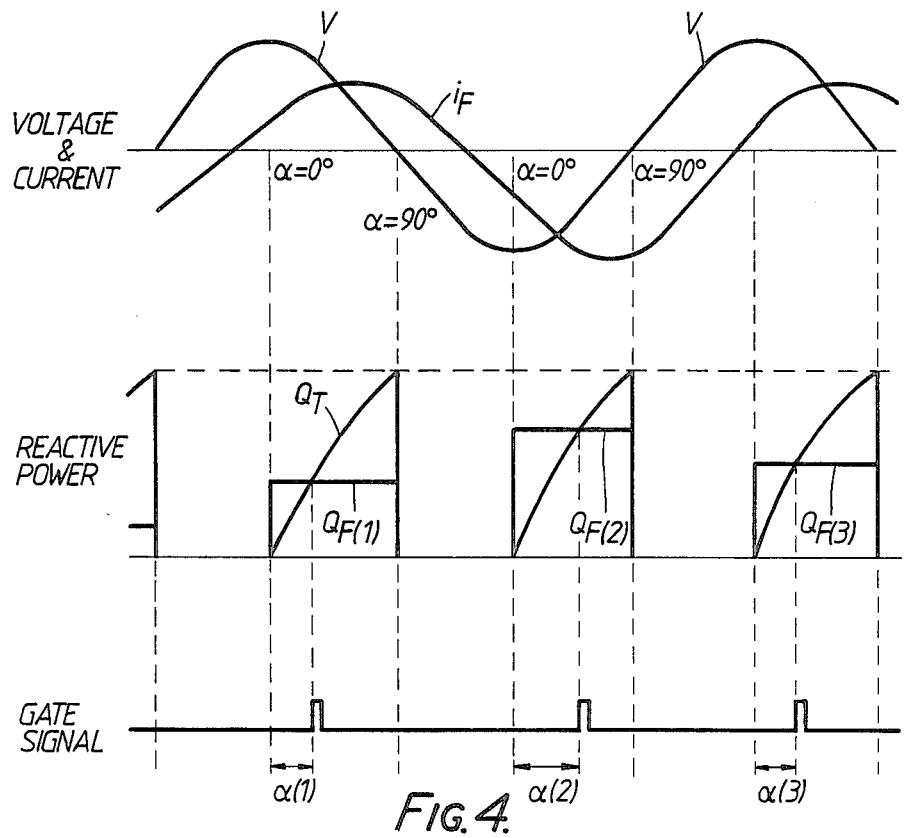
FIG. 4 is a timing chart showing the operation of the device shown in FIG. 1.

A load 50 of varying reactive power is connected to a three-phase AC power supply 52 using a Y or a delta connection. The power supply 52 has a power source 54 and system impedances 56 in series. A first reactive compensation circuit 58 is connected in parallel with the load 50. The first compensation circuit 58 comprises three of the reactive power compensation devices shown in FIG. 1. One reactive compensation device is connected to each phase of the three-phase power supply 52.

Each of these devices has a phase-lead capacitor 60 and a reactor 62 connected in parallel, and a pair of anti-parallel thyristors 64 connected in series with the reactor 62. A voltage detector 66 is arranged to detect the voltage applied on the load 50, and a current transducer 68 is arranged to detect the current flowing into the load 50. The thyristors 64 are controlled by a controller 70 based on the output signals of the voltage detector 66 and the first current transducer 68. The structure and the action of the first controller 70 is the same as that of the controller 30 of the prior art shown in Fig. 1.

As will be understood by one of ordinary skill in the art, the three reactive compensation devices are connected to the three phases, the connection of only one device being completed for simplicity. The end of the capacitors 60 not connected to a reactor 62 are connected to each other in a delta or Y configuration, the Y configuration being shown in the drawings. In this embodiment, there is further provided a second compensation circuit which is a self-commutated power converter 72 connected in parallel with the load 50. Second current transducers 74 are arranged for measuring total current into the load 50 and the first reactive power compensator 58. Third current transducers 76 are arranged for measuring the current into the second compensation circuit 72.

A second controller 78 is connected to the second compensation circuit 72. The second controller 78 controls the second compensation circuit 72 so as to compensate for the reactive power calculated from the output signals of the second current transducers 74 and the voltage detectors 66.

The second compensation circuit 72 is a self-commutated AC-DC power converter, and has AC reactors 80, gate turn-off thyristors (GTO's) 82, diodes 84 and a DC capacitor 86, as shown in FIG. 6.

The GTO's 82 are turned on and off at high speed, and pulse-width-modulation (PWM) control is effected. Therefore, the self-commutated converter 72 can be regarded as a constant current supply with an extremely good response. Consequently, the dead time in the frequency region of several tens of Hz or less, which constitutes a problem of voltage flicker, is negligibly small.

The second controller 78, shown in FIG. 5, has a 3-phase/2-phase current converter 88, a 3-phase/2-phase voltage converter 90, a reactive power detector 92, a synchronizer 94, an inverter 96, an instantaneous current calculator 98, a subtractor 100, an amplifier 102 and a gate circuit 104.

The action of this compensation device is described below. The reactive power of the load 50 is compensated in generally the same way by the first compensation circuit 58 as by the compensation circuit 18 shown in FIG. 1. The total current to the load 50 and the first compensator 58 is detected by the second current transducers 74. This current is a line current of a three-phase circuit and is converted to two-phase alternating current in the 3-phase/2-phase current converter 88.

Designating the three-phase alternating current as $i_R$, $i_S$ and $i_T$ and the two-phase alternating current as $i_d$ and $i_q$, this process is represented by the following equation.

$$\begin{pmatrix} i_d \\ i_q \end{pmatrix} = \sqrt{\frac{2}{3}} \begin{pmatrix} 1 & -1/2 & -1/2 \\ 0 & \sqrt{3}/2 & -\sqrt{3}/2 \end{pmatrix} \begin{pmatrix} i_R \\ i_S \\ i_T \end{pmatrix} \quad (3)$$

The circuit voltage is similarly determined by the voltage detectors 66 and is converted to two-phase alternating voltage in the 3-phase/2-phase voltage converter 90. This conversion is equivalent to substituting i by v in Eq. (3).

$$\begin{pmatrix} v_d \\ v_q \end{pmatrix} = \sqrt{\frac{2}{3}} \begin{pmatrix} 1 & -1/2 & -1/2 \\ 0 & \sqrt{3}/2 & -\sqrt{3}/2 \end{pmatrix} \begin{pmatrix} v_R \\ v_S \\ v_T \end{pmatrix} \quad (4)$$

Two-phase-converted voltage signals $v_d$ and $v_q$ are filtered by the synchronizer 94 to give synchronization voltage signals $v_d^*$ and $v_q8^*$.

The reactive power detector 92 detects so-called instantaneous real power and instantaneous imaginary power as defined in the Denatsu Gakkai-Shi (Voltage Institute Journal) Paper 58-B60 P. 41–48 "Instantaneous reactive power generalization theory and its applications". The detector 92 performs the calculation of the following equation.

$$\begin{pmatrix} p \\ q \end{pmatrix} = \begin{pmatrix} i_d & i_q \\ i_q & -i_d \end{pmatrix} \begin{pmatrix} v_d^* \\ v_q^* \end{pmatrix} \quad (5)$$

where P is instantaneous real power and q is instantaneous imaginary power. $v_d*$ and $v_q^*$ are mutually normal components and have a magnitude of 1 Pu (power unit) in two-phase alternating current and it can be assumed that $v_d \simeq v_d^*$ and $v_q \simeq v_q^*$. Thus, p is instantaneous effective power supplied from the power supply 52 to the load 50, and q is instantaneous reactive power circulating between the two phases.

Since the voltage variation in the power system is mainly governed by the reactive power variation and the variation due to effective power can be neglected, it is satisfactory if self-commutated converter 72 merely compensates for q.

The compensation quantity $q_C^*$ is obtained by inverting the sign of q in the inverter 96.

$$q_C^* = -q_C \quad (6)$$

Then, different line current command values $i_{CR}^*$, $i_{CS}^*$ and $i_{CT}^*$ are calculated in the instantaneous current calculator to make self-commutated converter 72 operate as a constant current source. These are determined by inverse transformation of Eqs. (5) and (3). Designating command values in two-phase alternating current as $i_{Cd}^*$ and $i_{Cq}^*$, they are given as $$\begin{pmatrix} i_{Cd}^* \\ i_{Cq}^* \end{pmatrix} = \begin{pmatrix} v_d^* & -v_q^* \\ v_q^* & v_d^* \end{pmatrix} \begin{pmatrix} p^* \\ q^* \end{pmatrix} \quad (7)$$

$$\begin{pmatrix} i_{CR}^* \\ i_{CS}^* \\ i_{CT}^* \end{pmatrix} = \sqrt{\frac{2}{3}} \begin{pmatrix} 1 & 0 \\ -1/2 & \sqrt{3}/2 \\ -1/2 & -\sqrt{3}/2 \end{pmatrix} \begin{pmatrix} i_{Cd}^* \\ i_{Cq}^* \end{pmatrix} \quad (8)$$

Since the power variation due to effective power is negligible as noted above, p* can be neglected compared with q* in Eq. (7).

Subsequently, from Eqs. (7) and (8), $$\begin{pmatrix} i_{CR}^* \\ i_{CS}^* \\ i_{CT}^* \end{pmatrix} = \sqrt{\frac{2}{3}} \begin{pmatrix} 1 & 0 \\ -1/2 & \sqrt{3}/2 \\ -1/2 & -\sqrt{3}/2 \end{pmatrix} \begin{pmatrix} -v_q^* q^* \\ v_d^* q^* \end{pmatrix} \quad (9)$$

The differences between the command values thus determined and the actual line currents $i_{CR}$, $i_{CS}$ and $i_{CT}$ of the self-commutated converter 72 detected by the third current transducer 76 are calculated by the subtractor 100. The differences are then amplified in the amplifier 102. The output of the amplifier 102 is input to the gate circuit 104 and on/off pulses for PWM control of the converter 72 are generated and supplied to the gates of the gate turn-off thyristors 82 shown in FIG. 6. The DC capacitor 86 for making the DC voltage constant is necessary as this self-commutated converter 72 is a constant voltage type. However, the capacity of the DC capacitor 86 can be small, since only the instantaneous reactive power, i.e., only the power circulating between the phases, and not the real power, is compensated and so in principle the current flowing in the DC circuit is zero and it is satisfactory to compensate only the current accompanying the commutations in the gate turn-off thyristors 82. The AC reactors 80 act to smooth pulse-width modulated voltage and convert it to current.

As is clear from the description above, the embodiment has the following advantages:

(1) Since the dead time of a self-commutated converter is very much less than that of a thyristor-phase-control reactor, combination with a conventional thyristor-phase-control reactor type reactive power compensation device gives a better response and improved reactive power compensation performance;

(2) The voltage variation suppression performance is improved since the self-commutated converter also compensates for reactive power which is caused by high frequencies and which is responsible for lowering of the compensation performance in conventional systems; and (3) The system is more economical than one in which all compensation is done by a self-commutated converter, since the greater portion of the load's reactive power variation is compensated by a low-cost thyristor-phase-control reactor type reactive power compensation circuit and only the current not compensated by the thyristor phase control reactor type reactive power compensation circuit is compensated by a self-commutated converter.

The foregoing description has been set forth merely to illustrate a preferred embodiment of the invention and is not intended to be limiting. Since modification of the described embodiment incorporating the spirit and substance of the invention may occur to persons skilled in the art, the scope of the invention should be limited solely with respect to the appended claims and equivalents.

What is claimed is:

1. A device for compensating for reactive power in a system including an AC power source and a load, the device comprising:

means for detecting reactive power in the load;

a first reactive power compensation circuit, having a reactor and a thyristor connected in series, and a capacitor connected in parallel to the reactor and the thyristor, the first compensation circuit being connected in parallel to the load, the thyristor being controlled based on the detected reactive power in the load;

means for detecting total reactive power in the load and the first compensation circuit;

a second reactive power compensation circuit having a self-commutated power converter connected in parallel to the load; and means for controlling the second compensation circuit to minimize the detected total reactive power in the load and the first compensation circuit.

2. A device according to claim 1, wherein the second reactive power compensation circuit includes a DC capacitor and a gate-turn-off thyristor for pulse-width modulation control.

3. A method of compensating for reactive power in a system including an AC power source and a load, the method comprising steps of:

detecting reactive power in the load;

compensating for reactive power in the load based on the detected reactive power in the load by a first compensation circuit which has a reactor and a thyristor connected in series, and a capacitor connected in parallel to the reactor and the thyristor;

detecting total reactive power in the load and the first compensation circuit; and compensating reactive power in the load and the first compensation circuit based on the detected total reactive power in the load and the first compensation circuit by a second reactive power compensation circuit having a self-commutated power converter connected in parallel to the load.

4. A method according to claim 3, wherein the steps of compensating reactive power in the load and the first compensation circuit is controlled by pulse-width modulation control.

* * * * *